(12) United States Patent
Banerjee et al.

(10) Patent No.: US 7,394,769 B2
(45) Date of Patent: Jul. 1, 2008

(54) METHOD, SYSTEM AND ARTICLE FOR RAPID DETECTION AND AVOIDANCE OF HIGH DATA CORRUPTING ROUTES WITHIN A NETWORK

(75) Inventors: Dwip N. Banerjee, Austin, TX (US); Vinit Jain, Austin, TX (US); Vasu Vallabhaneni, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 10/640,819

(22) Filed: Aug. 14, 2003

(65) Prior Publication Data

US 2005/0036452 A1    Feb. 17, 2005

(51) Int. Cl.
*H04J 1/16* (2006.01)
(52) U.S. Cl. .................................. 370/252; 370/235
(58) Field of Classification Search ................ 370/235, 370/236, 228, 218, 217, 230, 232; 709/232, 709/230, 233; 714/1, 2, 18
See application file for complete search history.

(56) References Cited

U.S. PATENT DOCUMENTS 6,097,697 A * 8/2000 Yao et al. .................... 370/230
6,330,614 B1   12/2001 Aggarwal et al.
6,501,754 B1 * 12/2002 Ohba et al. .................. 370/389
6,912,196 B1 *  6/2005 Mahalingaiah ............... 370/216
2003/0039245 A1 *  2/2003 Khosravi et al. ............. 370/389

* cited by examiner

*Primary Examiner*—Ricky Ngo
*Assistant Examiner*—Kan Yuen
(74) *Attorney, Agent, or Firm*—D'Ann N. Pifai; Dillon & Yudell LLP

(57) ABSTRACT

A receiving host in a TCP/IP network sends an acknowledgment indicating a received data packet is corrupt. The sending host will begin transmitting with a new field set in the IP header called a check-TCP-checksum bit, thereby requesting that all routers in the TCP/IP network perform a checksum on the entire received packet. Routers in the TCP/IP network will perform a complete checksum on an entire packet with the check-TCP-checksum bit set, and not just on the IP header. The routers continuously monitor the ratio of corrupt packets received on a particular port that fail the entire packet checksum to the total number of packets received on that port. If the ratio of corrupt-to-received packets exceeds a corruption threshold, the router assumes that the associated link is causing data corruption and issues a routing update indicating that the link is bad and should be avoided. Once the retransmission rate between the sender and receiver drops below a threshold level, the bad link has been detected and avoided within the TCP/IP network and the check-TCP-checksum option in the IP header is no longer set in data packets transmitted to the receiver host.

8 Claims, 15 Drawing Sheets

| Verifier | Header Length | TOS | Total Length |
| Identification | | Fig. | Fragment Offset |
| TTL | Protocol | Checksum (CK_TCP_CKSUM) |
| Source Address |
| Destination Address |

610

METHOD, SYSTEM AND ARTICLE FOR RAPID DETECTION AND AVOIDANCE OF HIGH DATA CORRUPTING ROUTES WITHIN A NETWORK

TECHNICAL FIELD

The present invention is related in general to data transfers in data processing system networks and in particular to transfer of data blocks over the Internet or similar networks. Still more particularly, the present invention relates to quickly detecting routes within the Internet causing high data corruption and efficiently re-routing data around such high data corrupting routes.

BACKGROUND

Networks provide for transmission of information from a source to a destination over a particular route. The information is transmitted along the route through routers. Typically, each router has knowledge of various routes available in the network and this knowledge is stored in a route database or route table. The information is transmitted throughout the network in accordance with a particular protocol and routers in the network may support any of a number of protocols. Thus, the router may store multiple routes, which are available using multiple protocols.

The Internet has become a particularly important network for transmission and distribution of data (text, code, image, video, audio, or mixed) and software. Users connect to the backbone of the Internet with broadly divergent levels of performance, ranging from 14.4 Kb/s to more than 45 Mb/s. Transmission Control Protocol/Internet Protocol (TCP/IP) has become a widely implemented standard communication protocol in Internet and Intranet technology, enabling broad heterogeneity between clients, servers, and the communications systems coupling them. Internet Protocol (IP) is the network layer protocol and Transmission Control Protocol (TCP) is the transport layer protocol. At the network level, IP provides a "datagram" delivery service. By contrast, TCP builds a transport level service over the datagram service to provide guaranteed, sequential delivery of a byte stream between two IP hosts.

In a large network such as the Internet, it is possible for one of the routes within the network to be causing data corruption. While each router along the route will perform a checksum on the header of each data packet received to detect data corruption of the packet, some data corruption caused along the route may only be detectable by performing a checksum on the entire payload of the received packet. Therefore, routers within the network are not aware that they are forwarding corrupted packets to the destination. This data corruption is only detected upon the packet's arrival at the receiving host, which performs a checksum on the entire payload. The receiving host will then send an acknowledgment to the sending host requesting retransmission of the corrupted data packets. However, since the sender host and receiver host hosts have no way of knowing which route caused the data corruption, they are unable to avoid that route in the retransmission of the data packets. Further, the sender host and receiver host hosts have no way of informing the routers within the network of the data corruption so that the routers can correct or avoid the corrupting route. Consequently, it can be seen that there is a need for a communications routing protocol and system that provides the rapid detection of bad links within the network so that the routers can route data packets around data corrupting links.

SUMMARY OF THE INVENTION

In accordance with the present invention, improved methods, systems and articles of manufacture for detection and avoidance of data links causing data corruption in an IP network are disclosed. One preferred method of the present invention, comprises the steps of: receiving a data packet over a data link at a router within an IP network, wherein the data packet is sourced by a sender and destined for a receiver and contains an indication to perform a checksum on the entire data packet; performing a checksum on the entire data packet, in response to receiving the data packet containing the indication to perform the checksum on the entire data packet; modifying a value indicating the number of data packets received over the data link that failed the checksum, in response to a failure of the checksum of the entire data packet; and performing a routing update to avoid transmission of data packets over the data link, if the value exceeds a corruption threshold for the router.

All objects, features, and advantages of the present invention will become apparent in the following detailed written description.

BRIEF DESCRIPTION OF THE DRAWINGS

FIG. 6B shows the format for an IP header, in accordance with a preferred embodiment.

DETAILED DESCRIPTION OF PREFERRED EMBODIMENTS

This invention is described in a preferred embodiment in the following description with reference to the figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention.

Figure 1:
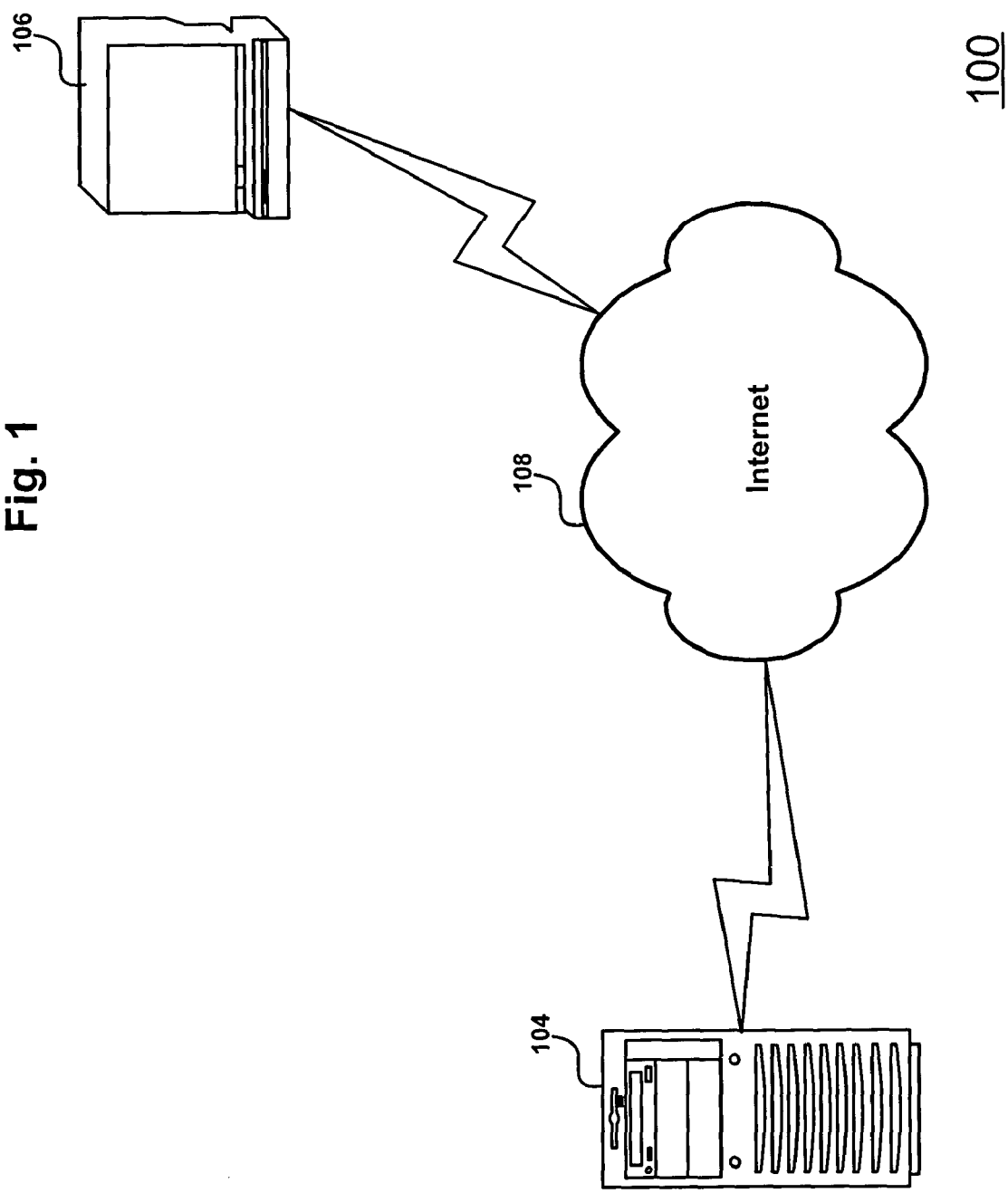
FIG. 1 a data processing system network in which a preferred embodiment of the present invention may be implemented is depicted.

With reference now to the figures, and in particular with reference to FIG. 1, a data processing system network in which a preferred embodiment of the present invention may be implemented is depicted. Data processing system network 102 includes at least one server system 104 coupled to at least one client system 106 via at least one network such as the Internet 108. Data transfers between the server system 104 and client system 106 conform to the TCP/IP specification, as well as File Transfer Protocol (FTP), HyperText Transfer Protocol (HTTP), or some similar communications protocol. As will be appreciated, while only a single server system 104 and single client system 106 are shown, data processing system network 102 may include any number of server and client systems (not shown) interconnected by one or more connections and networks, including Internet 108.

In order to transfer data over a network, it is necessary to have a set of rules so that every portion of the transfer sequence is properly executed. Each of these rules is called a protocol, and a set of rules is called a protocol suite. The most common set of protocols that are used when transferring data over the Internet and various other networks such as LANs (local area networks) and WANs (wide area networks) is provided by the TCP/IP (Transmission Control Protocol/Internet Protocol) protocol suite. The TCP/IP protocol suite allows a variety of different types of computers, running different operating systems, to communicate with each other. TCP/IP forms the basis for the worldwide Internet, a wide area network of more than one million computers that literally spans the globe. There are many other network protocol suites in addition to the TCP/IP suite, including IPX/SPX (Internet Packet Exchange/Sequenced Packet Exchange), and NetBios. Although originally developed by independent research groups, most network protocols are open (non-proprietary) standards, many of which are published as a series of numerically-ordered RFC (Request for Comment) papers. For example, the IP protocol is RFC 791. The RFC papers are readily available on the Internet or at a various libraries. Although distinct, each of these network protocol suites are similar in structure, comprising a set of layers, with each layer responsible for a different facet of the communication task. For simplicity, the discussion below will primarily pertain to the use of the invention when using the TCP/IP protocol. However, it should be recognized by those skilled in the art that although the principles of the invention are described in reference to the TCP/IP protocol, the invention can also be applied to various other network protocols as well.

Flow control is the procedure of handling the mismatch in processing and buffering capacities between a receiver host and a transmitter to best utilize the bandwidth provided by the transmission medium. TCP flow control mechanisms operate exclusively at the end stations to limit the rate at which TCP endpoints emit data. However, TCP lacks explicit data rate control. The basic flow control mechanism is a "sliding window", superimposed on a range of bytes beyond the last explicitly acknowledged byte. The sliding window limits the maximum number of sequential bytes between the byte most recently sent from the server to the earliest byte for which a receipt acknowledgment has not yet been received from the client. This sliding operation limits the amount of unacknowledged transmissible data that a TCP endpoint can emit. A variety of algorithms automatically re-send packets and slowly restart data transmission when the sliding window limit is exceeded. Thus, if the link between the server and client is shut down in the middle of transmission of a data collection, the server will stop sending packets within one sliding window of the last packet acknowledged by the client. This use of a sliding window inherently limits the bandwidth of a data transfer through the network.

Figure 2:
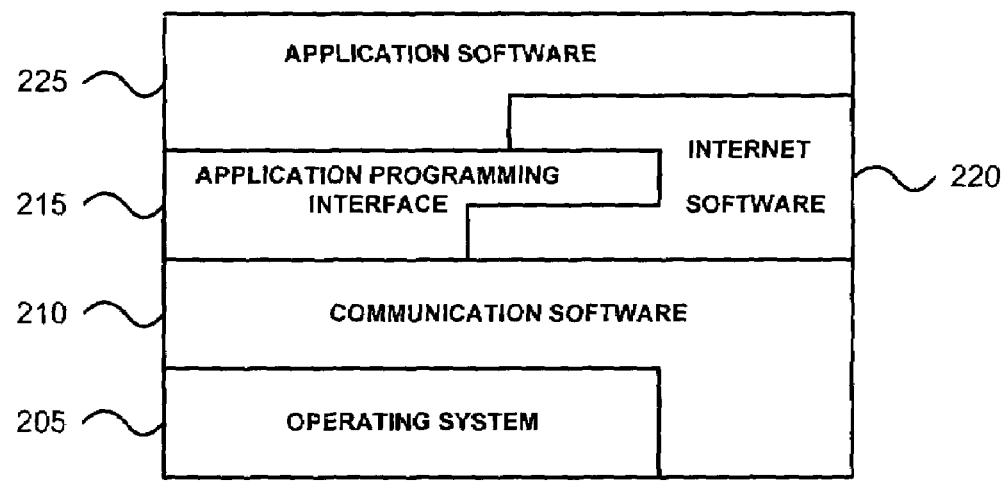
FIG. 2 is a depiction of a typical software architecture for a server-client system, as may be utilized in a preferred embodiment of the present invention.

FIG. 2 is a depiction of a typical software architecture for a server-client system, as may be utilized in a preferred embodiment of the present invention. Server 104 and client 106 are each architected with software architecture 200. At the lowest level, an operating system 205 is utilized to provide high-level functionality to the user and to other software. Such an operating system typically includes a BIOS (Basic Input Output System). Communication software 210 provides communications through an external port to a network such as the Internet via a physical communication link by either directly invoking operating system functionality or indirectly, bypassing the operating system to access the hardware for communications over the network. The application programming interface 215 allows the user of the system, be it an individual or a software routine, to invoke system capabilities using a standard consistent interface without concern for how the particular functionality is implemented. The Internet software 220 represents any one of several standard commercial packages available for equipping a computer with Internet functionality. The application software 225 represents any number of software applications designed to react to data through the communications port to provide the desired functionality the user seeks. Applications at this level may include those necessary to handle data, video, graphics, photos or text, which can be accessed by users of the Internet.

Figure 3:
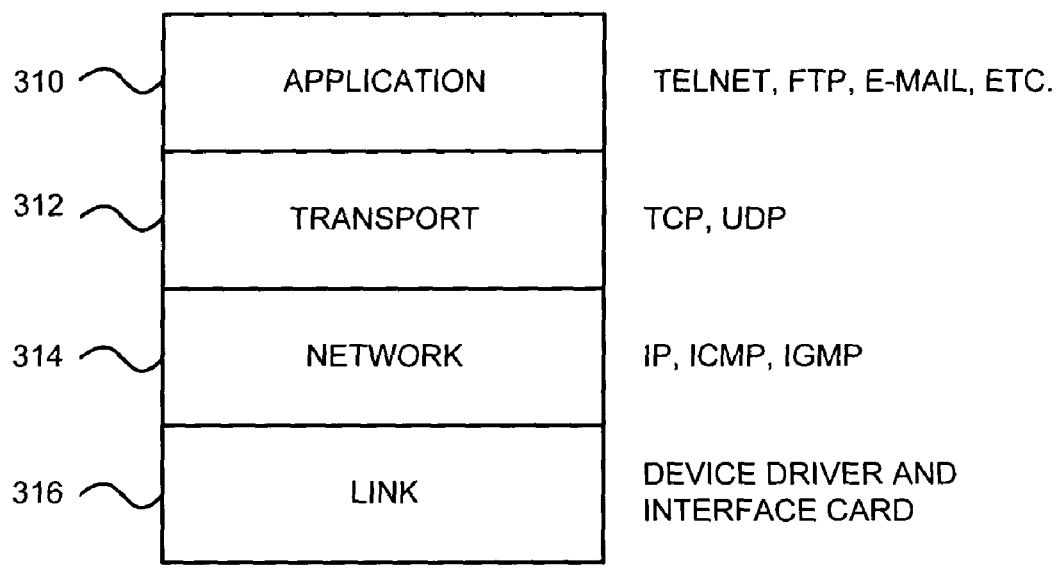
FIG. 3 shows an example of a 4-layer communications architecture utilizing TCP/IP.

As shown in FIG. 3, TCP/IP and similar protocols are utilized by a 4-layer communications architecture 300 for the network comprising an application layer 310, a transport layer 312 a network layer 314, and a link layer 316. Each layer is responsible for handling various communications tasks, as follows. The link layer 316 (also referred to as the data-link layer or the network interface layer) normally includes the device driver in the operating system and the corresponding network interface card in the computer. Together they handle all the hardware details of physically interfacing with the network media being used, e.g. Ethernet cable, etc.

The network layer 314 (also referred to as the internet layer) handles the movement of packets of data around the network. For example, the network layer handles the routing of the various packets of data that are transferred over the network. The network layer in the TCP/IP suite is comprised of several protocols, including IP (Internet Protocol), ICMP (Internet Control Message Protocol), and IGMP (Internet Group Management Protocol).

The transport layer 312 provides an interface between the network layer 314 and the application layer 310 that facilitates the transfer of data between two host computers. The transport layer is concerned with things such as dividing the data passed to it from the application into appropriately sized chunks for the network layer below, acknowledging received packets, setting timeouts to make certain the other end acknowledges packets that are sent, etc. In the TCP/IP protocol suite there are two distinctly different transport protocols: TCP (Transmission Control Protocol) and UDP (User Datagram Protocol). TCP provides reliability services to ensure that data is properly transmitted between two hosts, including dropout detection and retransmission services. Conversely, UDP provides a much simpler service to the application layer by merely sends packets of data called datagrams from one host to the other, without providing any mechanism for guaranteeing that the data is properly transferred. When using UDP, the application layer must perform the reliability functionality.

The application layer 310 handles the details of the particular application. There are many common TCP/IP applications that almost every implementation provides, including (1) Telnet for remote login; (2) FTP, the File Transfer Protocol; (3) SMTP, the Simple Mail Transfer protocol, for electronic mail, and (4) SNMP, the Simple Network Management Protocol.

Figure 4:
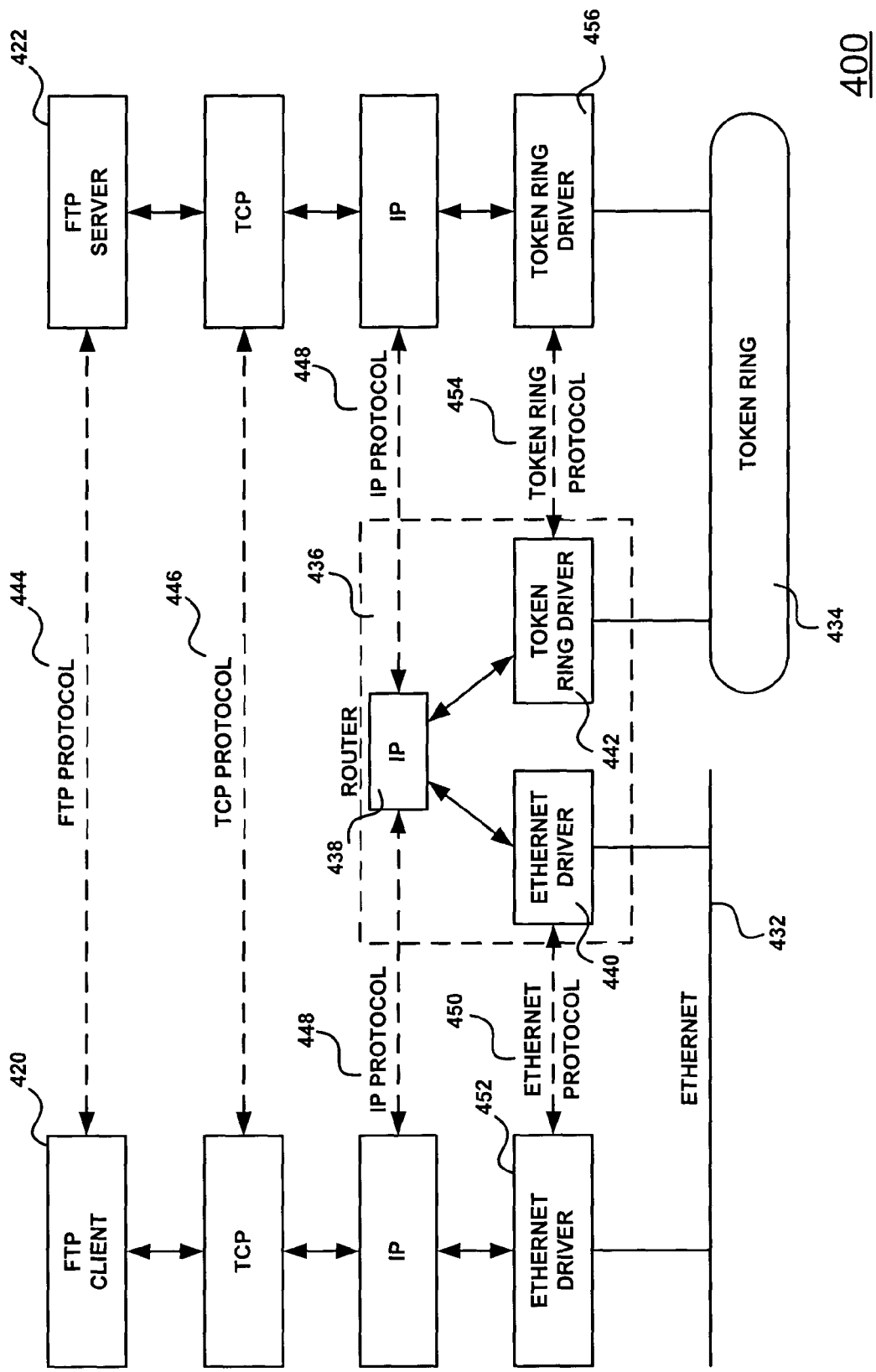
FIG. 4 shows an example of an internet comprising an Ethernet network connected to a token ring network by a router.

Networks such as the Internet are interconnected by routers, which each connect two or more networks together. Typical routers comprise a special-purpose hardware box with input and output connections and dedicated hardware and/or embedded software that allow many different types of physical networks to be connected, such as Ethernet, token ring, point-to-point links, etc. FIG. 4 shows an internet 400 comprising an Ethernet network 432 connected to a token ring network 434 by a router 436. Although FIG. 4 only shows two hosts in communication, any host on the Ethernet network can communicate with any host thereon, or with any host on the token ring network, and vice versa.

As shown in FIG. 4, the router 436 comprises a network layer module 438 (an IP module in this case), and appropriate network drivers for connecting to the host networks, namely an Ethernet driver 440 and a token ring driver 442. At the application layer, the network comprises an FTP client 420 and an FTP server 422. Most network applications are designed so that one end is the client and the other side is the server. The server provides some type of services to various clients, in this case, access to files on the server host. Each layer has one or more protocols for communicating with its peer at the same layer. These communication protocols include the FTP protocol 444 at the application layer, the TCP protocol 446 at the transport layer, the IP protocol 448 at the network layer, and the Ethernet protocol 450 and token ring protocol 454 at the link layer. It is common for the application layer to handle user processes, while the lower three layers (transport, network and link) are implemented in the kernel of the operating system, such as UNIX or Windows operating system. For example, the purpose of the network interface layer is to handle the details of the communication media (Ethernet, token ring, etc.), while the purpose of the application layer is to handle one specific user application (FTP, Telnet, etc.).

The application layer and the transport layer use end-to-end protocols (FTP protocol 444, TCP protocol 446). The network layer provides a hop-to-hop protocol that is used on the two end systems and every intermediate system in between (for clarity only one intermediate system is shown here). For instance, the IP module 438 of the router 436 is connected to the two hosts by IP protocols 448. There are also link layer protocols that are specific to the various types of host networks that are connected to the router to handle communication between the networks and the router at the link layer. Thus, an Ethernet protocol 450 is used to handle communications between the Ethernet driver 440 in the router 436 and the Ethernet driver 452 of the hosts on the Ethernet network 432, while a token ring protocol 454 is used to handle communications between the token ring driver 442 of the router 436 and the token ring driver 456 of the hosts on the token ring network 434.

In the TCP/IP protocol suite the network layer, IP, provides an unreliable service. It moves a packet of data from a source to a destination, but it provides no mechanism for guaranteeing delivery, or even being able to determine if a proper transfer has occurred. TCP provides reliability services to ensure that data is properly transmitted between two hosts, including dropout detection and retransmission services.

A router has two or more network interface layers (since it connects two or more networks). Any system with multiple interfaces is called multi-homed. A host can also be multi-homed, but unless it specifically forwards packets from one interface to another, it is not called a router. Also, routers need not be special hardware boxes that only move packets around an internet. Most TCP/IP implementations allow a multi-homed host to act as a router, but the host needs to be specifically configured to support this use. In such instances, the system is either a host (when an application such as FTP or Telnet is being used) or a router (when it's forwarding packets from one network to another). Another way to connect networks is with a bridge. Bridges connect networks at the link layer, while routers connect networks at the network layer. Bridges make multiple LANs appear to the upper layers as a single LAN.

Figure 5:
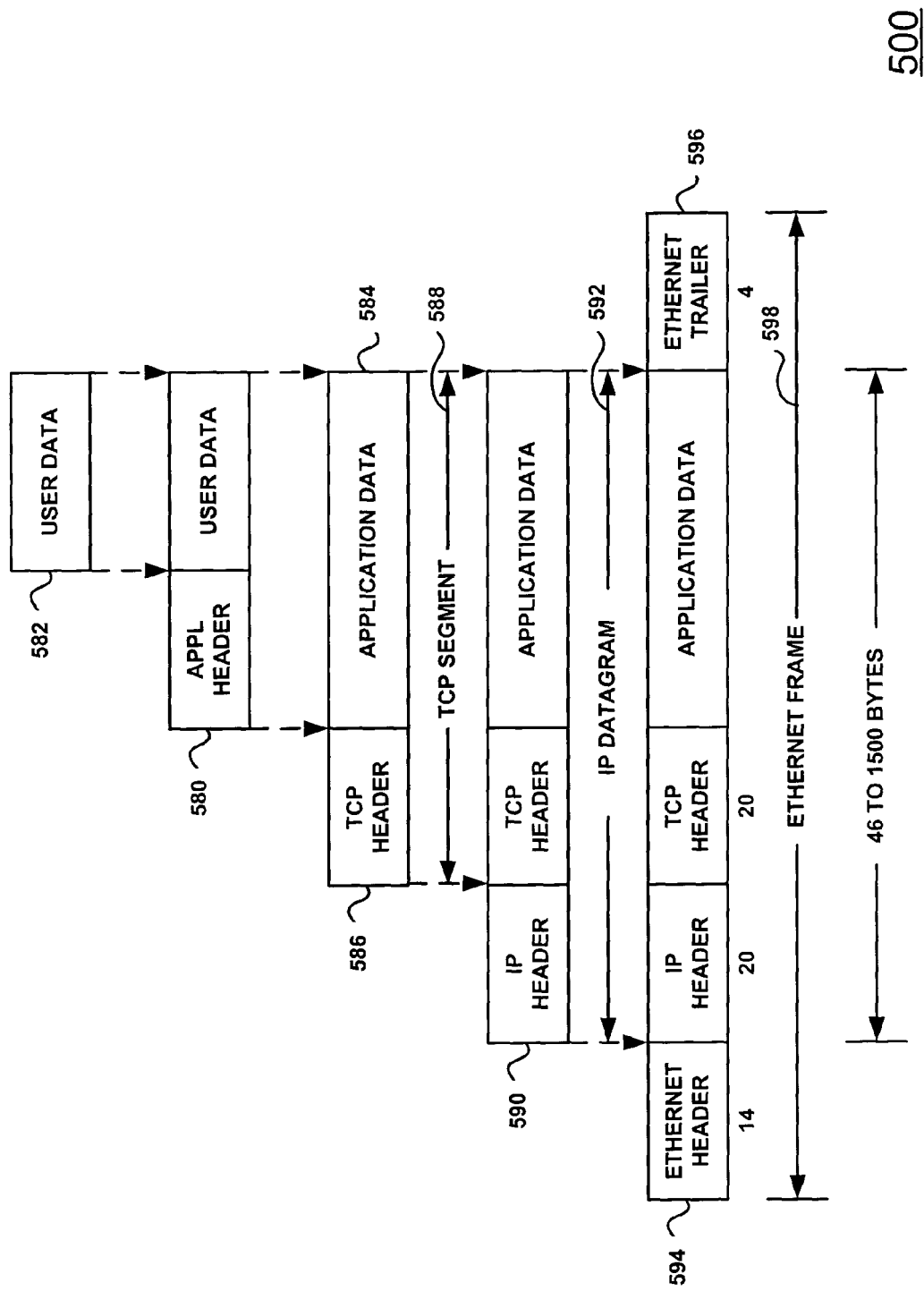
FIG. 5 shows the format of data as it traverses the TCP/IP protocol stack.

When an application sends data using TCP/IP, the data is sent down a protocol stack, through each layer, until it is sent as a stream of bits across the network. As shown in FIG. 5, each layer adds information to the data by prepending headers (and sometimes adding trailer information) to the data that it receives. For instance, at the application layer an application header 580 is prepended to user data 582 to form application data 584. At the transport layer a transport protocol header is prepended to the application data. In the case of FIG. 5 the transport layer is TCP, and therefore a TCP header 586 is prepended to the application data 584, thereby forming a TCP packet 588 that is sent to the network layer IP. The TCP header 586 comprises twenty bytes. Similarly, at the network layer, a network layer header is prepended to the transport layer data. In the case of TCP/IP, an IP header 590 is prepended to the TCP packet 588 to form an IP datagram 592. The IP header 590 also comprises twenty bytes. Finally, at the link layer a media header such as Ethernet header 594 is added to the data received from the network layer to form a packet of data. In some instances, such as when the media is Ethernet, a media trailer is also appended to the end of the data. For instance, in FIG. 5 an Ethernet trailer 96 is appended to the Ethernet Header 594 and the IP datagram 592 to form an Ethernet packet 598. The Ethernet packet comprises the stream of bits that flow across the network that correspond to the original application message data. The numbers (14, 20, 20, 4) at the bottom of the headers are typical sizes of the headers in bytes, e.g., the Ethernet header 94 comprises 14 bytes, etc. The size of the packet will be limited by the maximum transmission unit (MTU) of the type of network being used to transfer the data packet. For example, the MTU of an Ethernet network is 1500 bytes. The network layer automatically performs fragmentation (breaking the datagram up into smaller pieces), so that each fragment is smaller than the MTU of the network.

Figure 6A:
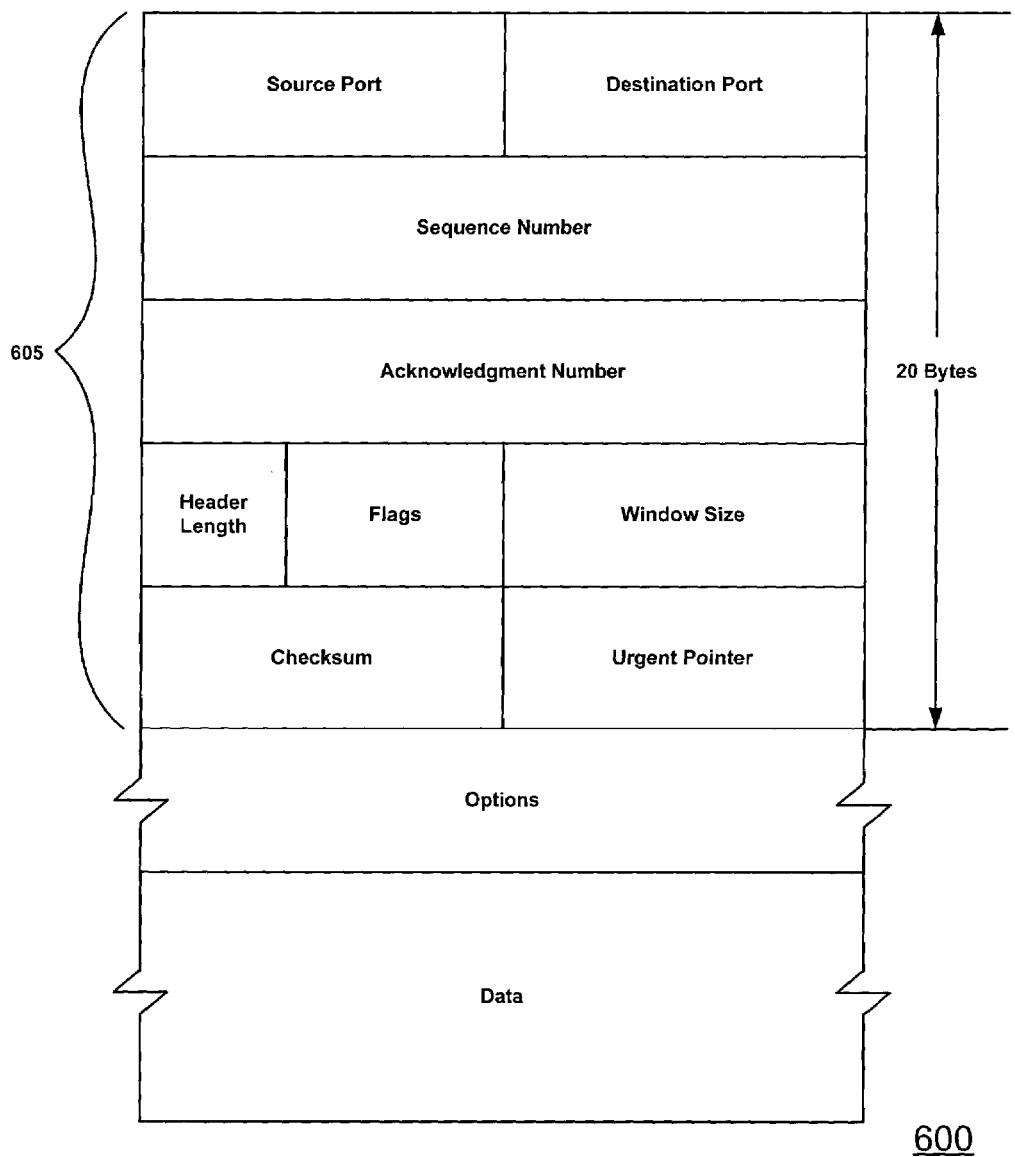
FIG. 6A shows the format for a TCP header

The format for a TCP header is shown in FIG. 6A. As seen, a TCP packet 600 is constructed from 32-bit words and includes a 20 byte (5-word) header. The basic layout of the TCP header 605 includes:

"source port number"—The source (and destination) port numbers are used for demultiplexing the data stream to applications. It is entirely possible for there to be multiple simultaneous TCP data streams between two hosts. A TCP data stream is uniquely identified by a group of four numbers.

These are the two hosts addresses and the two port numbers. The source port number is the one to be used as destination in any reply to the packet.

"destination port number"—This is the "target" port number on the remote system.

"sequence number"—This 32 bit number identifies the first byte of the data in the packet.

"acknowledgment number"—This 32 bit number is the byte number of the next byte that the sender host expects to receive from the remote host. The remote host can infer that all bytes up to this number minus one have been safely received and the remote host's local copies can be discarded.

"header length"—This 4-bit field specifies the header length in 32 bit words. Clearly the maximum value is 15 words (60 bytes) allowing for 10 (40 bytes) of options.

"flag bits"—This group of 6 bits identify various special states in the protocol. Several of the bits may be set simultaneously.

"window size"—This is translates from the amount of space that the receiver host has available for the storage of unacknowledged data. The units are bytes unless the window scale factor option is used. The maximum value is 65535.

"checksum"—This covers both the header and the data. It is calculated by prepending a pseudo-header to the TCP packet, this consists of three 32-bit words, which contain the source, and destination IP addresses, a byte set to 0, a byte set to 6 (the protocol number for TCP in an IP datagram header) and the packet length (in "words"). The checksum field of the TCP packet is set to zero and the following algorithm applied to the prepended packet treated as a sequence of 16-bit (unsigned) words. Note that the inclusion of the IP addresses in the checksum calculation means that TCP cannot easily be carried on lower level protocols other than IP.

"urgent pointer"—This is part of TCP's mechanism for sending urgent data that will overtake the normal data stream. If the URG flag bit is set this field indicates the position within the data of the last byte of the urgent data. There is no way of indicating where the urgent data starts.

"options"—There are a number of options defined in various RFCs. The most useful is the Maximum Packet Size (MSS) specification facility.

The format for an IP header 610 in accordance with the preferred embodiment is shown in FIG. 6B, and starts with a Version Number (Ver), currently assigned a value of "4". The next four bits represent the length of the header field (Hdr Length) in long words (32-bits). For almost all data packets on the Internet, this value is "5", which makes the header twenty bytes long. This number increases, however, if the datagrams are of special type, called Options packets. The next eight bits are called "ToS" bits, representing the Type of Service that is assigned to this datagram. Different applications have different service requirements for delivery from the network, which are encoded, in the ToS field. The next sixteen bit field is the Total Length of the datagram in bytes, limiting the length of the IP datagram to $2^{16}$; i.e. 65535 bytes. The next sixteen bits, called the "Identification" field, uniquely identifies each datagram sent by a host. The next two fields are flag (FLG) and Fragmentation Offset fields, which are used to packet datagrams and reassemble them as they travel through networks that have limitations on the maximum size of datagrams.

The next field shown in the IP header 610 of FIG. 6B is called the Time To Live or TTL field, which is responsible for limiting the number of hops a datagram may make through a network. This field decrements at each networking node in the network. If this field reduces to zero before reaching the desired destination, the datagram is dropped. This mechanism prevents infinite looping between two networking nodes because of some routing error. The next field is the Protocol field, used by the hosts to distinguish the higher layer application for which this datagram is intended. This allows for simultaneous multiple applications to exist between the same two hosts. Header Checksum is the next field, which normally provides the checksum generating function and guaranties the validity of the header. The Checksum is calculated over the entire header and stored in the header.

In accordance with the preferred embodiment, following the header Checksum is a special flag called the check-TCP-checksum ("CK_TCP_CKSUM"), which instructs a receiving networking node to perform a checksum on the entire received packet (a "packet checksum" as used herein). In accordance with the preferred embodiment, when a Router in the network receives a packet with the CK_TCP_CKSUM bit set in the IP header, it will compute a checksum on the entire TCP payload 600, in addition to the checksum of the header that is performed utilizing the header Checksum in IP header 610. The Checksum value stored in the TCP header 605 of the packet is utilized to perform this checksum of the entire packet at the networking node. If the CK_TCP_CKSUM bit is not set, only the checksum of the header, utilizing the header Checksum in IP header 610, is performed.

Followed by this field are two addresses: the Source network Address and the Destination network Address. Each host is assigned a unique address, which allows a network to forward the stream of datagrams from one node to the other.

Figure 6C:
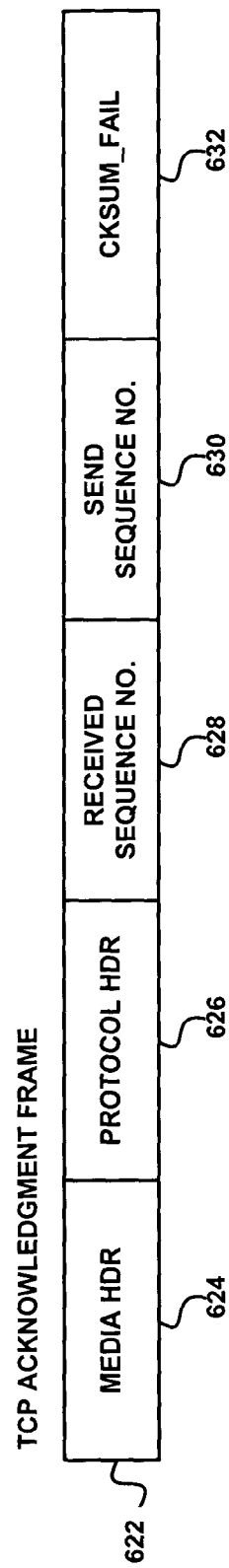
FIG. 6C the data structure of a TCP acknowledge frame, in accordance with a preferred embodiment of the present invention.

When the client detects that certain data packets are missing from the data transmission stream, the client will request that the server retransmit the missing packet by sending the sequence number of the first byte of the missing packet in an acknowledge frame. As seen in FIG. 6C, the format of a TCP acknowledge frame 622 comprises a media header 624, a protocol header 626, a received sequence number field 628, and a send sequence number field 630. The media header 624 will be particular to the type of network, e.g., an Ethernet header for an Ethernet network, etc. The protocol header 626 will depend on the transport and network layer protocol used, such as TCP/IP, IPX/SPX, Netbios, etc. The received sequence number field 628 provides an identifier to the last sequence number reliably received by the computer. The send sequence number 630 corresponds to the relative sequential number of the message.

The checksum failed (CKSUM_FAIL) flag 632 provides a special flag that may be set by the receiving host when a TCP checksum fails on a received packet, in accordance with a preferred embodiment of the present invention. Upon determining that a received packet contains corrupted data, the receiver host would set the checksum-failed flag 632 in the acknowledgment packet 622 returned to the sender host.

In the simplified Internet representation of FIG. 1, datagrams are forwarded from a source to a destination in an automatic manner. From the sender host's point of view, it only knows the destination address and does not know the route by which the datagram reaches the final destination. For the automatic delivery of IP datagrams, a harmonious coexistence of IP Routing Protocols is provided, running on intermediate networking nodes inside the Internet, the IP Routing Protocols being intelligent mechanisms on each internetworking node that share information about networking addresses with other internetworking nodes via Routing datagrams called IP Routing PDU's. The IP Routing Protocols on each internetworking node create and maintain databases that allow it to forward ingress datagrams to the next internetworking node on the way to its final destination.

Figure 7:
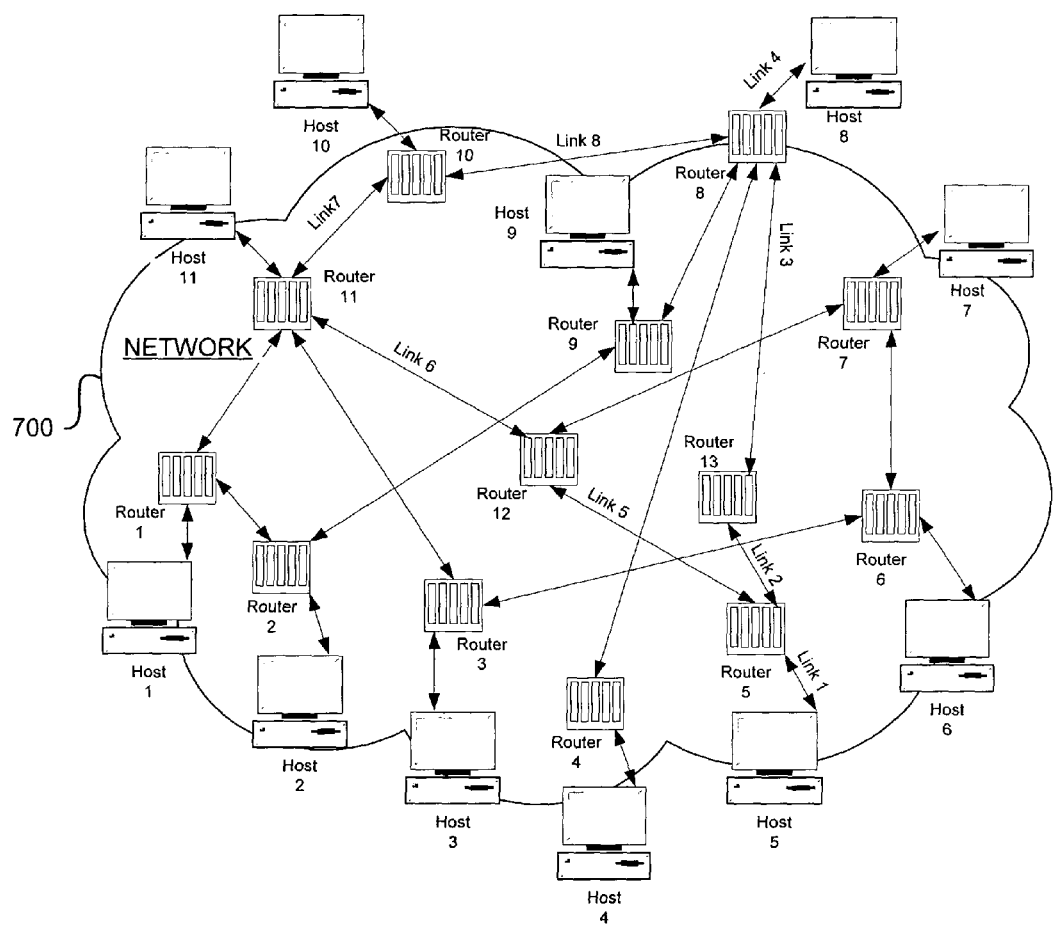
FIG. 7 shows a representation of a network such as the Internet.

A representation of a network such as the Internet is presented in FIG. 7. In the example of FIG. 7, eleven Hosts are shown connected to a network of thirteen Routers, which are geographically independently located. Each networking node, called a Router, has connections to a subset of the total number of networking nodes. There may not be a fully meshed interconnection; i.e. each Router may not be connected directly to every other Router in the network. As an example, assume that Host 1 would like to send a datagram to Host 9. Host 1 could achieve this in a few ways, by sending the datagram to Router 1. Router 1 may then forward the datagram to Router 2, and then Router 2 forwards the datagram to the ultimate destination Router 9, which then forwards it to Host 9. Host 1 could also have sent the datagram to Router 1, with Router 1 then forwarding the datagram to Router 11, which then forwards to Router 10, which then forwards to Router 8, and then finally Router 8 may forward the datagram to Router 9, that in turn sends it to Host 9.

The many coexisting IP Routing Protocols collectively provide the information for Router 1 to determine which Router it is forward a datagram to (Router 2 or Router 11 in the above example, and with the same question raised at every internetworking node of the Internet) to create a network in a non-fully meshed connected Internet. Each Router creates a database of hierarchical topology of destination network addresses that it learns from other Routers via the Internet Routing Protocols, called a Routing Table. From the Routing Table, each Router creates another database, called a Forwarding Table, which maps a destination network address to one of its interfaces; meaning, that if a Router gets a datagram from a Host or other Router from a directly connected interface, then by examining the destination network address in the header and applying it to the Routing Table, the Router can determine which one of the local interfaces or ports should be used to forward the datagram. Using these two tables, the Routing Table and the Forwarding Table, a datagram that enters the network can thus be forwarded to the eventual destination by examining the datagram IP header and looking up the Forwarding Table to find the next interface to which to send the datagram. There are two very popular IP Routing Protocols, BGP and OSPF, which include IPv6 and the MPLS. IPv6 is a proposal to solve some of the address space limitations. MPLS, on the other hand, is a proposal to streamline the Forwarding Process of IP Datagrams. One of the common themes of the two proposals is to discard any Checksum field at the IP header layer. Underlying the present invention, however, is the discovery of significant advantages that can be obtained by enhancing the checksum functionality as is described below.

Figure 8:
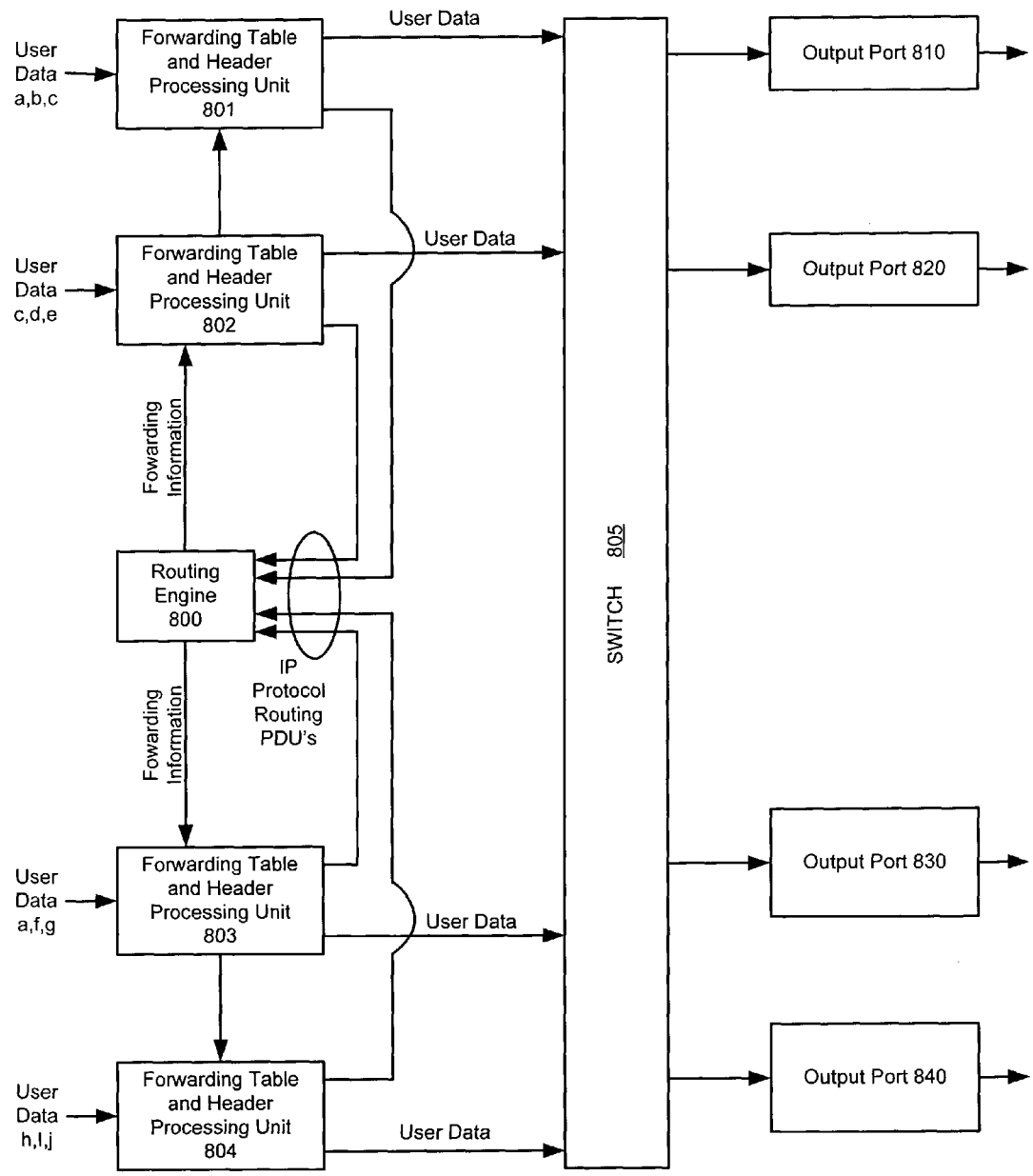
FIG. 8 shows the hardware of a router used to accept and forward an IP datagram.

FIG. 8 describes the hardware in a Router required to accept and forward an IP datagram in an IP networking node. The Router must first process the IP header of the incoming packet. The egress interface of the datagram is determined based on the incoming Destination Address in the incoming IP datagram. Once a header is verified, the data is either sent to another port in the networking node or to a Routing Engine within the networking node. A typical architecture of a Router networking node is implemented with a Routing Engine 800 connected to multiple interfaces of the networking node. All IP Routing Protocol data destined for the Routing Engine 800 are forwarded to the Routing Engine 800 by all ingress ports. The Routing Engine 800 examines the Routing Protocol PDUs and learns destination network addresses of the various networks, and then calculates the egress interface number for the network addresses. The destination network address and egress interface number form an entry into the Forwarding Table (as shown by the example of Forwarding Table 904 in FIG. 9A). The Routing Engine 800 then sends the Forwarding Table or updates thereof to each ingress interface, thereby instructing each ingress header processing unit (Units 801-804 in FIG. 8) how to determine the exit interface of each incoming datagram. Each ingress header processing unit will then verify every datagram, examine the destination field, and then index the destination in the Forwarding Table to determine the egress port number of the datagram.

Figure 9A:
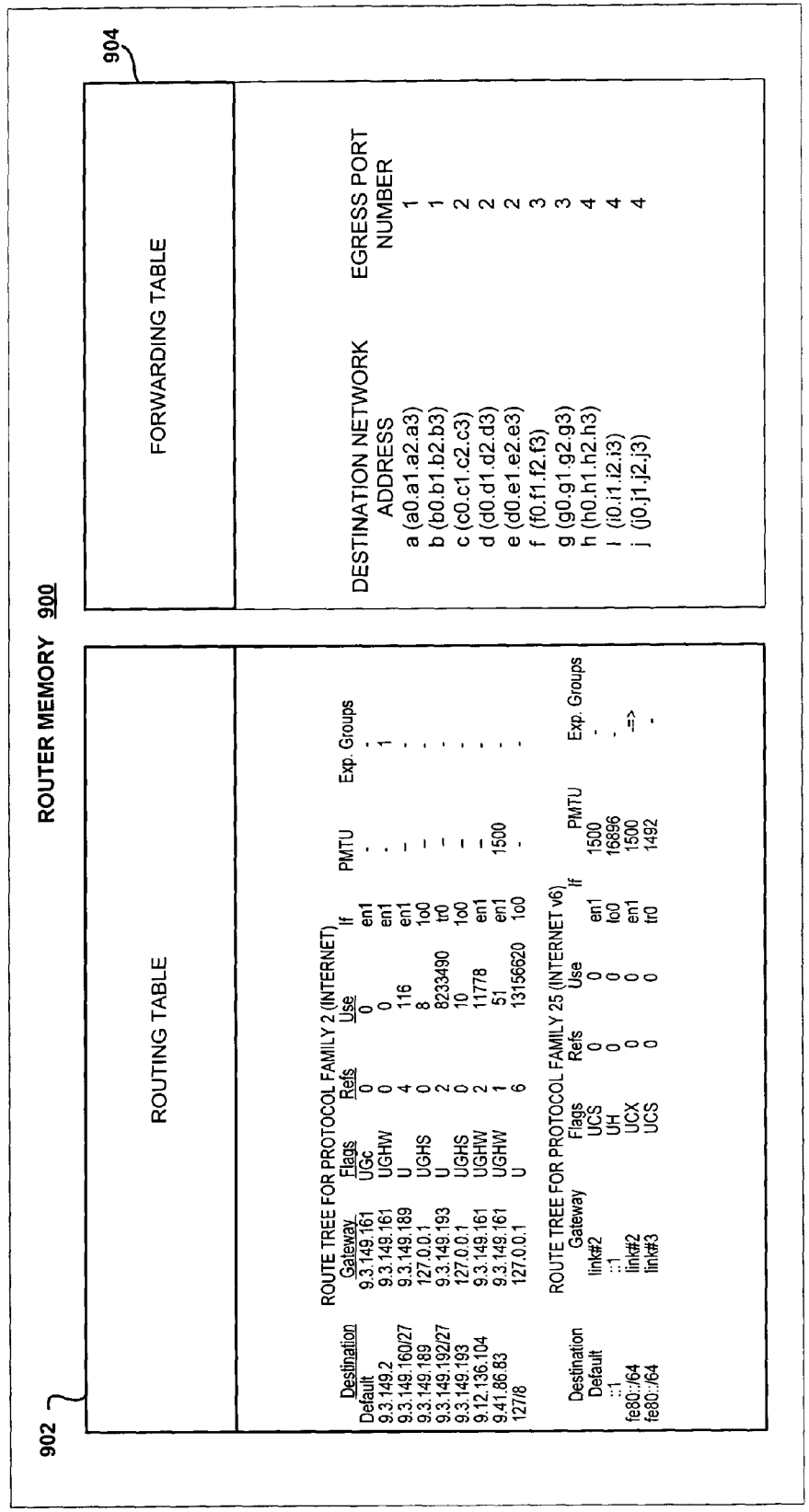
FIG. 9A shows a routing table and a forwarding table, in accordance with a preferred embodiment.

An exemplary process will now be detailed, using the high level networking node diagram of FIG. 8. Assuming some combinations of IP Routing Protocols, Routers attached respectively on the other side of Units 801, 802, 803 and 804 are respectively advertising reachability to network addresses a, b and c, to network addresses c, d and e, to network addresses a, f and g, and finally, to network addresses h, i, and j. In this simple example, the Routing Engine 800 sees multiple exit or output ports, labeled as Output Ports 810-840. The Routing Engine 800 will decide, based on one of many options, such as cost, hop count, etc., the best exit port to reach destination network address 'a' and destination network address 'c', for example. Assuming for this example that the Routing Engine 800 chooses the interface to port 810 for the forwarding of all datagrams destined for network address 'a', and it chooses port 820 for the forwarding of all datagrams destined for network address 'c', the Routing Engine 800 will thereupon create the Forwarding Table 904 shown in FIG. 9. In practice, the Forwarding Tables on a backbone Router can extend to tens of thousands of entries. Each network address in FIG. 9A is listed within parenthesis as four numbers, which represents the real network address as four bytes. The Forwarding Table is then forwarded to each input or ingress data port by the Routing Engine 800 to permit the Header Processing Units 801-804 to examine all incoming datagrams and match the destination address in the Forwarding Table and thereby determine the corresponding appropriate output or egress interface port 810, 820, 830, 840. The datagram is then sent to that output port via the switch 805.

With reference back to FIG. 7, an example of how the preferred embodiment provides rapid detection and avoidance of data routes within a network causing high data corruption is now provided. In this example, Link 2 within Network 700 is picking up noise that is causing data corruption to packets traversing over the Link. Thus, when Host 5 initiates data communication with Host 8, the data stream is likely to pick up noise in Link 2 via the route Link 1-Link 4. If the corrupted data packets were permitted to traverse through Network 700 from Host 5 to Host 8, Host 8 would perform a checksum on the received packets and determine that some data packets had corrupted data. However, because Host 5 and Host 8 have insufficient information to determine the route the corrupted data packets took through Network 700, they cannot explicitly discern the Link causing the corruption and instruct the Network 700 to avoid the corrupt Link. However, in accordance with the preferred embodiment, Host 8 sends an acknowledgment packet 622 with the checksum failed bit 632 set, indicating that the received sequence number packet had data corruption and requesting the Network implement the rapid detection and corrupt link avoidance routine of the preferred embodiment.

When Host 5 receives an acknowledgment frame 622 with a checksum fail bit 632 (CKSUM_FAIL) that is set, Host 5 will begin transmitting all packets within the current communication session it is conducting with Host 8 with the check-TCP-checksum (CK_TCP_CKSUM) bit in the IP header set, thereby requesting that all receiving routers perform a packet checksum on the received packet, in accordance with the preferred embodiment. Upon receiving a packet with the check-TCP-checksum bit set, router 5 will perform a complete checksum on the entire packet, and not just on the IP header. In a preferred embodiment, the packet checksum is performed by conducting both an IP header checksum and a TCP payload checksum as were described in conjunction with IP header 610 and TCP header 605. In an alternative embodiment, the CK_TCP_CKSUM bit is expanded to a field providing a checksum value for the entire packet, including the TCP/IP payload, and the checksum is performed against this combined value.

Assuming that Link 1 is not introducing errors, the packet checksum performed by Router 5 will confirm the packet is good and will permit Router 5 to continue routing the packet based on the destination port. The routing and forwarding tables in Router 5 will then direct the data packet over Link 2 en route to Host 8. Upon receiving the data packet, Router 13 will detect that the check-TCP-checksum bit has been set and will perform a packet checksum on the entire packet. Because Link 2 has been introducing noise, the packet checksum performed by Router 13 will fail, indicating that the link between Router 5 and Router 13 is bad. Router 13 will then drop the corrupted packet and update a register maintaining a count of the number of packets detected as corrupt over a set period.

Figure 9B:
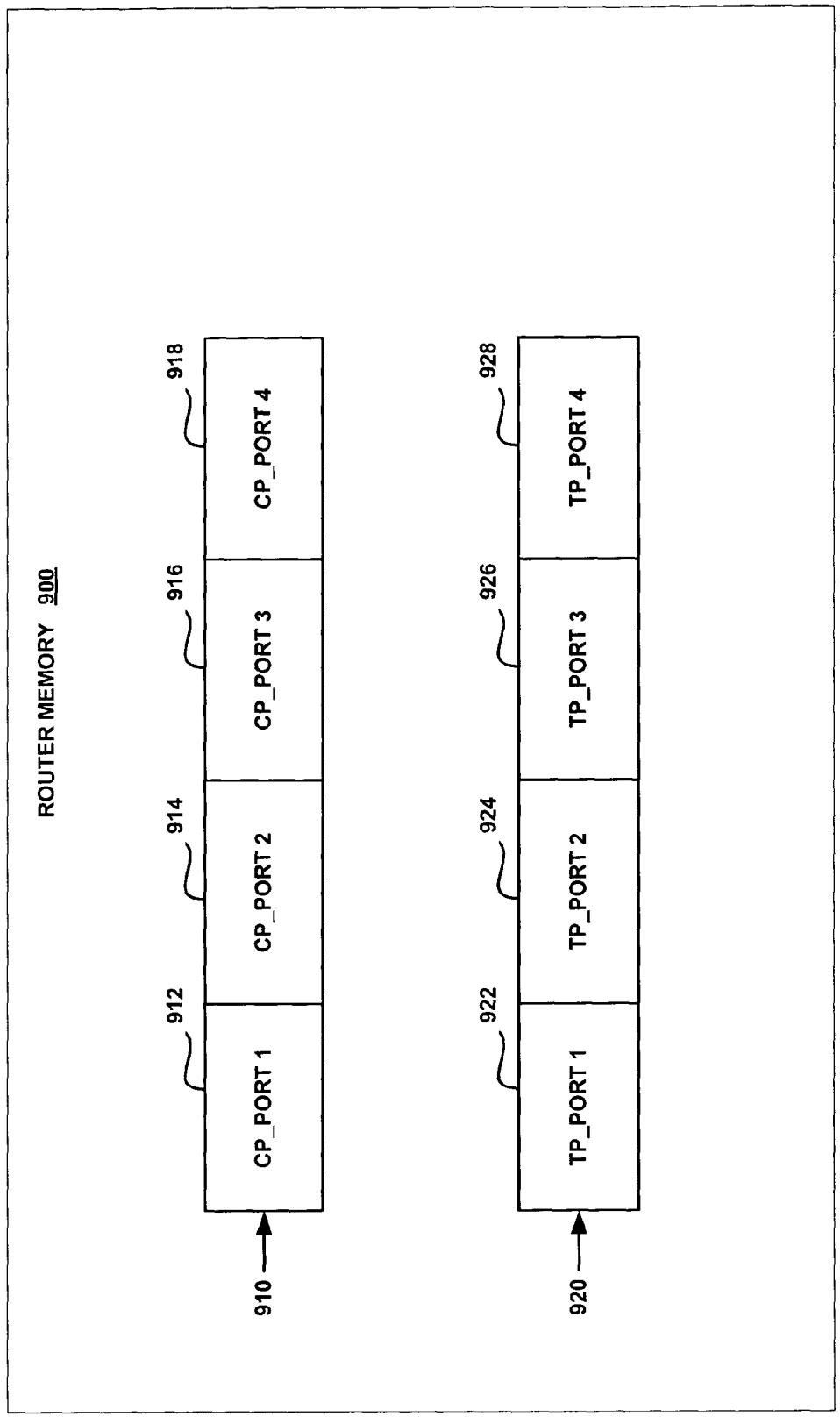
FIG. 9B shows registers in router memory, in accordance with a preferred embodiment.

As seen in FIG. 9B, registers 920 within router memory 900 keep track of the total number of packets received by its router and registers 910 keep track of the number of packets received that are corrupt, in accordance with a preferred embodiment. Registers 910 include Register 912 containing a value for the number of corrupt packets detected on Port 1 (CP_PORT A), Register 914 containing a value for the number of corrupt packets detected on Port 2 (CP_PORT B), Register 916 containing a value for the number of corrupt packets detected on Port 3 (CP_PORT C), and Register 918 containing a value for the number of corrupt packets detected on Port 4 (CP_PORT D). Registers 920 include Register 922 containing a value for the total number of data packets received on Port 1 (TP_PORT 1), Register 924 containing a value for the total number of data packets received on Port 2 (TP_PORT 2), Register 916 containing a value for the total number of data packets received on Port 3 (TP_PORT 3), and Register 918 containing a value for the total number of data packets received on Port 4 (TP_PORT 4). Registers 910 and 920 are reset to "0" on a periodic basis, for example every five minutes.

When a router receives a packet over one of its ports, the corresponding value in Register 920 is incremented and the corresponding value in Registers 910 for the port is incremented by "1" if the packet is detected as bad. Thus, for example, if Router 13 is connected to Link 2 on its input port 3, the variable stored in Register 926 would be incremented by "1" each time a data packet was received on Port 3, and, additionally, the variable stored in Register 916 would be incremented by "1" each time a corrupt packet was received on Port 3.

The router continuously monitors the ratio of corrupt packets on a particular port to the total number of packets received on the port (i.e. CP_PORT_/TP_PORT_). If the ratio for a particular port exceeds a "corruption threshold" preset by an administrative policy of the router, then the link is indicated as bad. In a preferred embodiment, the link would be deemed bad if the ratio of corrupt-to-received packets in a given five minute interval exceeded a twenty percent (20%) threshold. If the ratio of corrupt-to-received packets for a particular port does not exceed the preset threshold, then the router will continue to operate as normal and continue to use the link connected to the port.

Therefore, in accordance with the preferred embodiment, if the ratio of corrupt-to-received packets for a particular port exceeds the corruption threshold, then the router assumes that the associated link is causing data corruption and will update its Routing Table to eliminate routing from that link. As required by the routing protocol, the router would also issue a routing update to other routers in the network indicating that the link is bad and should be avoided. In a preferred embodiment, a link-state advertisement (LSA) provided by the OSPF (Open Shortest Path First) protocol is utilized to provide a routing update to the other routers coupled to Ports 1-4 and communicate the identified corrupted link to be avoided. OSPF is an interior gateway routing protocol developed for IP networks based on the shortest path first or link-state algorithm. Routers use link-state algorithms to send routing information to all nodes in an internetwork by calculating the shortest path to each node based on the topography of the Internet constructed by each node. Each router sends that portion of the routing table that describes the state of its own links, and it also sends the complete routing structure (topography).

Returning to the example of FIG. 7, prior to a determination in accordance with the present invention that Link 2 is bad, the retransmission rate from Host 5 to Host 8 would have seen a large increase due to the required Fast Retransmit of many corrupted packets along the route of Links 1-2-3-4. Once a determination is made in accordance with the present invention that Link 2 is causing corruption and should be avoided, Router 13 issues a routing update to the network that will result in Router 5 forwarding data packets over Links 5-6-7-8-4 to arrive at Host 8, thereby avoiding the corrupted Link 2. Through the new route of Links 1-5-6-7-8-4, Host 5 will see the retransmission rate of lost or corrupted data packets begin to significantly drop for the connection session between Host 5 and Host 8. Accordingly, when the retransmission rate drops below a predetermined level set by an administration policy, Host 5 can then assume that the bad link has been detected and avoided within Network 700 through the process of the preferred embodiment, and will therefore stop setting the CK_TCP_CKSUM option in the IP Header of data packets transmitted to Host 8.

As will be appreciated, the preferred embodiment presents significant advantages over current routing algorithms and networks. First, network congestion is significantly relieved because corrupted packets are dropped at the routers when the corruption is detected, thereby eliminating the propagation of the corrupted packets all the way to the receiving client host. Second, by providing a mechanism to target specific data packets for packet checksum computation, the probability of error detection over the links has been increased, thereby routing protocols to react faster to potential link outages.

Figure 10:
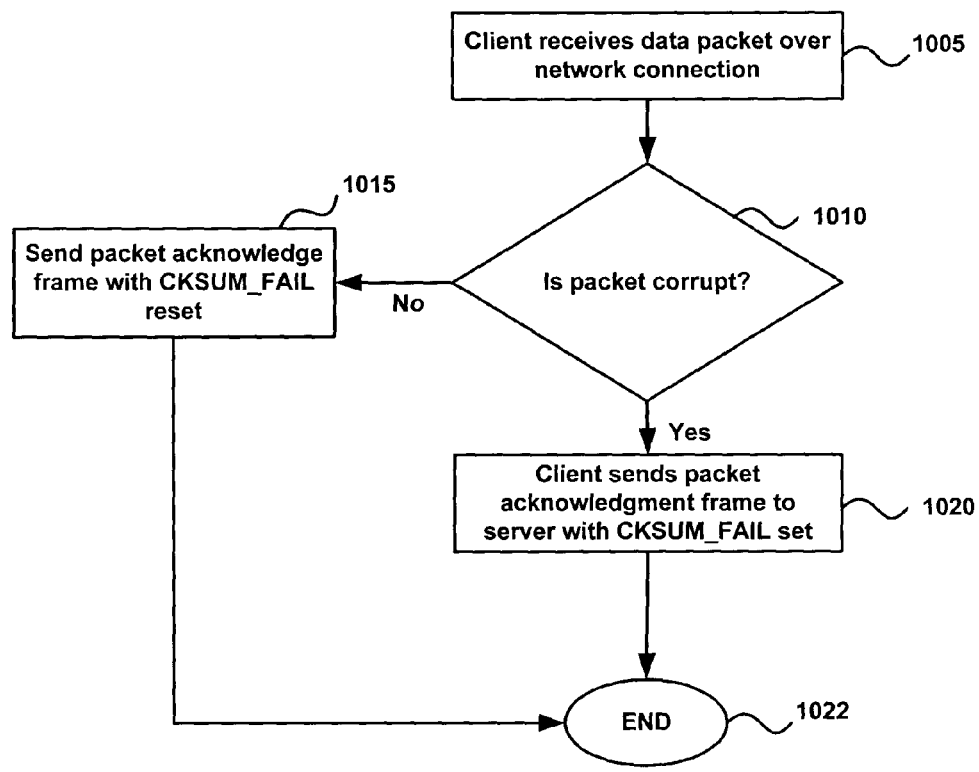
FIG. 10 shows a flow diagram of a process performed in client-server systems for indicating data corruption within a network, in accordance with a preferred embodiment of the present invention.

With reference now to FIG. 10, there is shown a process performed in client-server systems for indicating data corruption within a network, in accordance with a preferred embodiment of the present invention. The process 1000 begins at step 1005, when the client receives a data packet over a network connection. At step 1010, the client determines whether the received data packet is corrupt by performing a checksum on the entire data packet. If not, the process passes to step 1015, which shows that the client responds to receipt of the data packet by sending a packet acknowledgment frame with the CKSUM_FAIL flag reset, indicating that the received data packet had passed the checksum test at the client. From step 1015, the process ends at step 1022. Returning to decision block 1010, if the received data packet is determined to be corrupt, the process passes to step 1020, where the client sends an acknowledgment frame for the received packet with the CKSUM_FAIL flag set, indicating that the received packet had failed the checksum test and that the data packet was corrupt. From step 1020, the process ends at step 1022.

Figure 11:
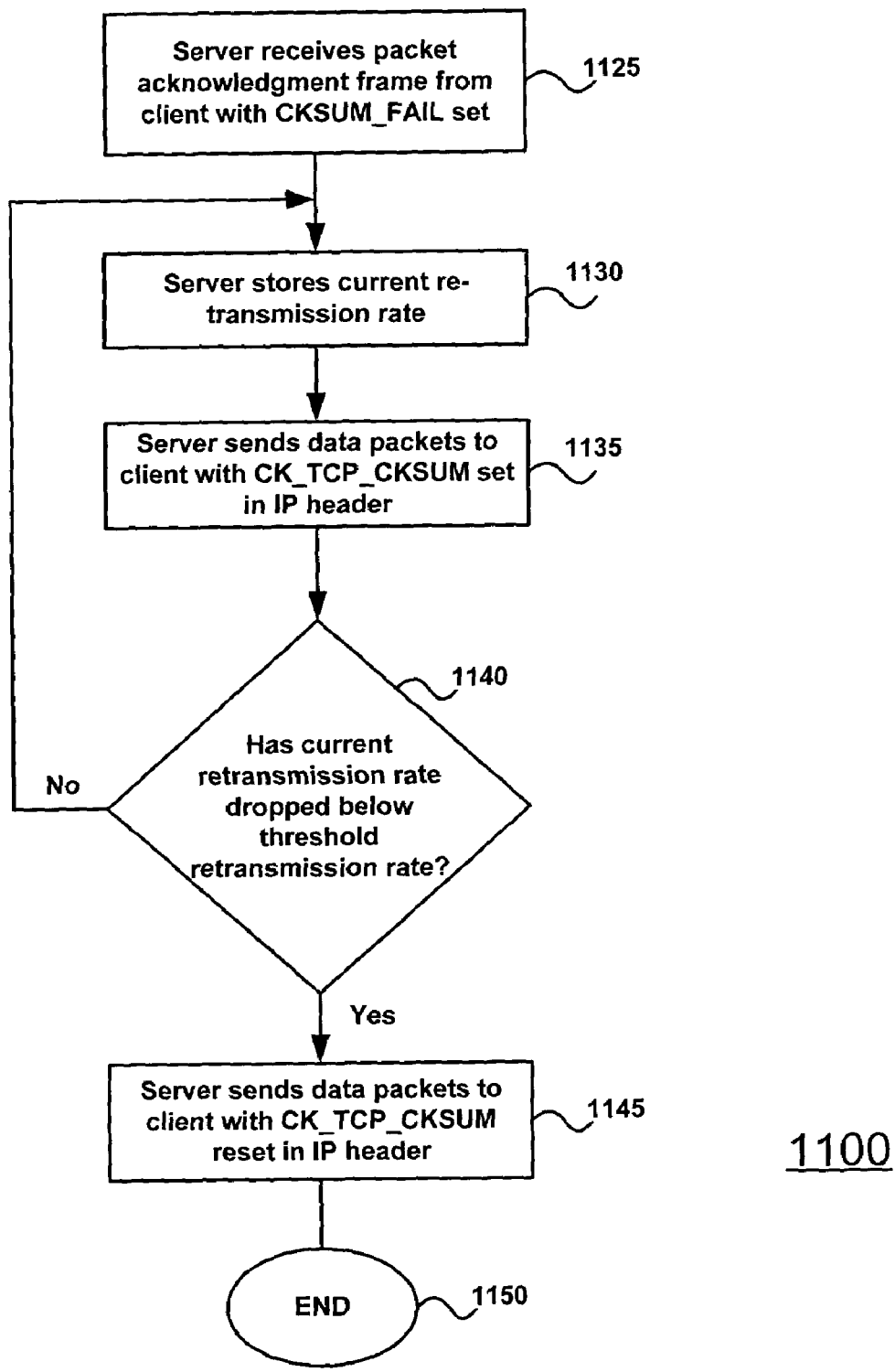
FIG. 11 shows a flow diagram of a process performed in client-server systems for indicating data corruption within a network, in accordance with a preferred embodiment of the present invention.

With reference now to FIG. 11, there is shown a process performed in client-server systems for indicating data corruption within a network, in accordance with a preferred embodiment of the present invention. The process 1100 begins at step 1105, when the client receives a packet acknowledgment frame with the CKSUM_FAIL flag set. The process passes to step 1130, where the server responds by sending all subsequent data packets to the client with the CK_TCP_CKSUM flag set in the IP Header of each such data packet, thereby requesting that each router in the network receiving the data packet perform a packet checksum on the entire packet upon receipt. The process then passes to step 1135, where the server stores the rate at which the sender host is being required to resend data packets to the client host (the "current retransmission rate") as a result of the Fast Retransmit algorithm of TCP for delivering lost or corrupt data packets to the client. The process then passes to decision block 1140 where the server determines if the current retransmission rate to the client has dropped below a predetermined threshold retransmission rate stored in the server. If not, the process returns to step 1130, where the latest current retransmission rate is stored in the server. If the decision at step 1140 indicates that the current retransmission rate has dropped below the threshold retransmission rate, the drop in current retransmission rate is assumed to be the result of the bad link within the route between server host and client host being detected and avoided by the routers within the network, in accordance with the present invention, and the process passes to step 1045, where the server sends subsequent packets to the client with the CK_TCP_CKSUM reset, thereby not requesting that routers receiving the data packet in the network perform a packet checksum on the entire data packet.

Figure 12:
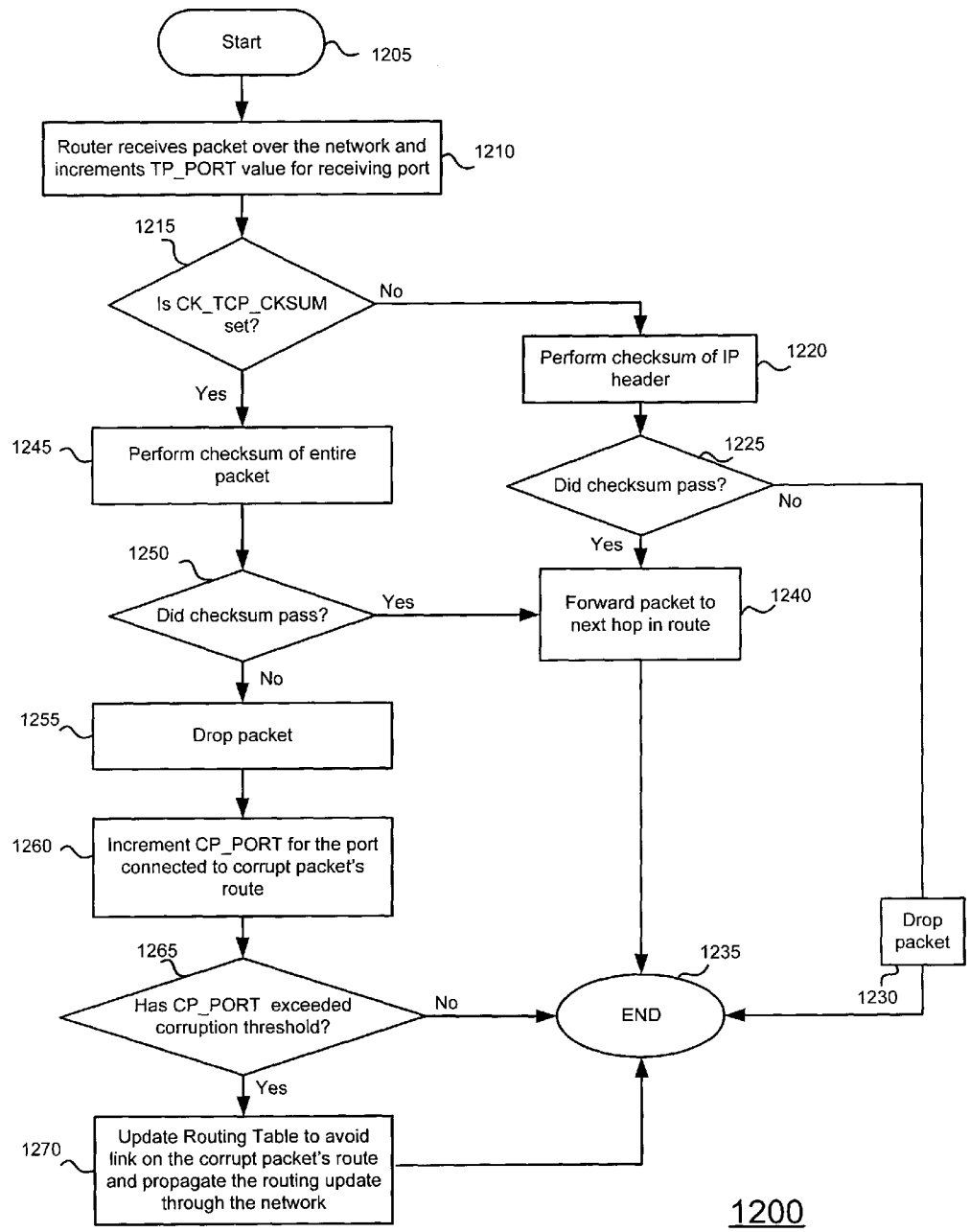
FIG. 12 shows a flow diagram of a process performed in network routers for providing rapid detection and avoidance of data routes within the network causing high data corruption, in accordance with a preferred embodiment of the present invention.

With reference now to FIG. 12, there is shown a process performed in network routers for providing rapid detection and avoidance of data routes within the network causing high data corruption, in accordance with a preferred embodiment of the present invention. The process 1200 starts at step 1205, and passes to step 1210, where a router within the network receives a data packet over a network connection on a given port, and increments the stored value of the total packets received over that port (TP_PORT_(stored in the registers 920). The process then passes to decision block 1215, where it is determined if the CK_TCP_CKSUM flag in the IP header of the received data packet is set. If not, the process passes to step 1220, where the router performs a checksum on the IP header of the packet. The process then passes to decision block 1225, where it is determined if the checksum test has passed. If not, the process passes to step 1230, where the router drops the packet, and the process thereafter ends at step 1235. If the decision at step 1225 is that the checksum passed, the process passes to step 1240, where the data packet is forwarded on to the next router in the route (next hop) through the network to the client. Thereafter, the process ends at step 1235.

Returning to decision block 1215, if the CK_TCP_CKSUM is set in a data packet received over the network, the process passes to step 1245, where the router performs a packet checksum on the entire data packet received. The process then passes to decision block 1250, where it is determined if the packet checksum of the entire data packet has passed. If so, the process passes back to step 1240, where the data packet is forwarded to the next hop in the route through the network to the client. If the decision at step 1250 is that the packet checksum has failed, the process passes to step 1255, where the router drops the received packet. The process then passes to step 1260, where the router increments the sorted value of the number of detected corrupt packets received over the port (C_PORT_) (stored in the registers 910). Thereafter, the process passes to decision block 1265, where it is determined if the value of C_PORT_is exceed the corruption threshold of the system. In a preferred embodiment, the corruption threshold is a percentage and the determination at step 1265 is whether the percent ratio of received corrupt packets to received total packets (C_PORT_/TP_PORT) is greater than the corruption threshold percent. If the decision at step 1270 is negative, the process ends at step 1235. If the determination at step 1265 is affirmative, the process passes to step 1270, where the router updates its Forwarding Table to avoid the link on the port and transmits a routing update to the network indicating that the link is bad, thereby updating all of the routers in the network on the bad link. Thereafter, the process ends at step 1235.

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code for remote execution. A method for practicing the invention may result from combining one or more machine-readable storage devices containing the code with appropriate standard computer hardware to execute the code. An apparatus for practicing the invention could be one or more computers and storage systems containing or having network access to computer program(s) coded in accordance with the invention.

What is claimed is:

1. A method in an IP network for detection and avoidance of data links causing data corruption, said method comprising the steps of:

receiving a data packet over a data link at a router within an IP network, wherein the data packet is sourced by a sender and destined for a receiver and contains an indication to perform a checksum on the entire data packet;

the router performing a checksum on the entire data packet prior to transmission of the data packet toward the receiver, in response to receiving the indication;

modifying a value in the router indicating a number of data packets previously received over the data link for which a checksum failed, in response to a failure of the checksum of the entire data packet;

performing a routing update to avoid transmission of data packets over the data link, if the value exceeds a corruption threshold for the router;

determining a retransmission rate of data packets from the sender to the receiver; and sending a data packet from the sender to the receiver, wherein the data packet does not contain an indication for a router receiving the data packet en route to the receiver to check the entire data packet for data corruption, if the retransmission rate is less than a predetermined threshold.

2. The method according to claim 1, further comprising the step of sending a packet acknowledgement from the receiver to the sender indicating that a received data packet is corrupt.

3. The method according to claim 1, wherein an entire data packet includes the IP header, the TCP header and the data payload of the data packet.

4. The method according to claim 1, wherein the value is stored in a register of the router.

5. The method according to claim 1, wherein the indication is a flag set in the IP header of the data packet.

6. The method according to claim 1, wherein the routing update is performed in conformance with OSPF.

7. The method according to claim 1, wherein the IP network is a TCP/IP network, and wherein the data packet is sourced by a TCP sender and destined for a TCP receiver.

8. A method in an IP network for detection and avoidance of data links causing data corruption, said method comprising the steps of:

receiving a data packet over a data link at a router within an IP network, wherein the data packet is sourced by a sender and destined for a receiver and contains an indication to perform a checksum on the entire data packet;

the router performing a checksum on the entire data packet prior to transmission of the data packet toward the receiver, in response to receiving the indication;

modifying a value in the router indicating a number of data packets previously received over the data link for which a checksum failed, in response to a failure of the checksum of the entire data packet;

performing a routing update to avoid transmission of data packets over the data link, if the value exceeds a corruption threshold for the router;

said method further comprising the step of:

(a) receiving a packet acknowledgement from the receiver indicating that a received data packet is corrupt;

(b) following receipt of the packet acknowledgement, sending data packets from the sender to the receiver that contain an indication for a router receiving the data packet en route to the receiver to check the entire data packet for data corruption;

(c) determining a retransmission rate of data packets from the sender to the receiver; and (d) performing step (b) until it is determined at step (c) that the retransmission rate is less than a predetermined threshold, and thereafter performing step (e);

(e) sending data packets from the sender to the receiver that do not contain an indication for a router receiving the data packets en route to the receiver to check the entire data packet for data corruption.

* * * * *